United States Patent
Lys et al.

(10) Patent No.: US 10,502,825 B2
(45) Date of Patent: Dec. 10, 2019

(54) RADIOELECTRIC DEVICE FOR TRANSMITTING AND RECEIVING RADIOELECTRIC WAVES AND ASSOCIATED RADIO ALTIMETRY SYSTEM

(71) Applicant: THALES, Courbevoie (FR)

(72) Inventors: Sébastien Lys, Gennevilliers (FR); Friedman Tchoffo-Talom, Gennevilliers (FR)

(73) Assignee: THALES, Courbevoie (FR)

( * ) Notice: Subject to any disclaimer, the term of this patent is extended or adjusted under 35 U.S.C. 154(b) by 323 days.

(21) Appl. No.: 15/216,530

(22) Filed: Jul. 21, 2016

(65) Prior Publication Data

US 2017/0227635 A1     Aug. 10, 2017

(30) Foreign Application Priority Data

Jul. 22, 2015   (FR) ...................................... 15 01559

(51) Int. Cl.
*G01S 13/88* (2006.01)
*H01Q 3/01* (2006.01)
(Continued)

(52) U.S. Cl.
CPC ............ *G01S 13/882* (2013.01); *G01S 13/32* (2013.01); *G01S 13/343* (2013.01); *H01Q 3/01* (2013.01); *H01Q 21/30* (2013.01); *H01Q 25/002* (2013.01)

(58) Field of Classification Search
CPC .......... G01S 13/882; G01S 13/32; H01Q 3/01
(Continued)

(56) References Cited

U.S. PATENT DOCUMENTS 4,691,206 A * 9/1987 Shapter .................. H01Q 13/18
343/700 MS
5,549,002 A * 8/1996 Howard ............... G01N 29/069
367/104
(Continued)

FOREIGN PATENT DOCUMENTS

GB           2 330 236 A  *  4/1999  ............. H01Q 21/28

OTHER PUBLICATIONS

Partial Machine Translation of Office Action dated Jul. 22, 2015 in FR1501559 (Year: 2015).*
(Continued)

*Primary Examiner* — Frank J McGue
(74) *Attorney, Agent, or Firm* — B. Aaron Schulman, Esq.; Stites & Harbison, PLLC

(57) ABSTRACT

A radioelectric device is provided for transmitting and receiving radio waves including a radio wave generator generating radio waves that are frequency-modulated by a predetermined modulation signal and a transceiver antenna system, having a transmission-reception angle with an associated antenna aperture value, able to transmit said transmitted radio wave and receive a radio wave, and an associated radio altimetry system. The antenna system includes a first array of radiating elements able to radiate in a first frequency band and at least one second array of radiating elements able to radiate in a second frequency band being made up of a regular pad of radiating elements or elementary patches, The radioelectric device also includes a plurality of activation elements able to activate and/or deactivate the first array and second array of radiating elements, and a control module able to control the activation elements based on a selected antenna aperture value.

10 Claims, 4 Drawing Sheets

Figure 1:
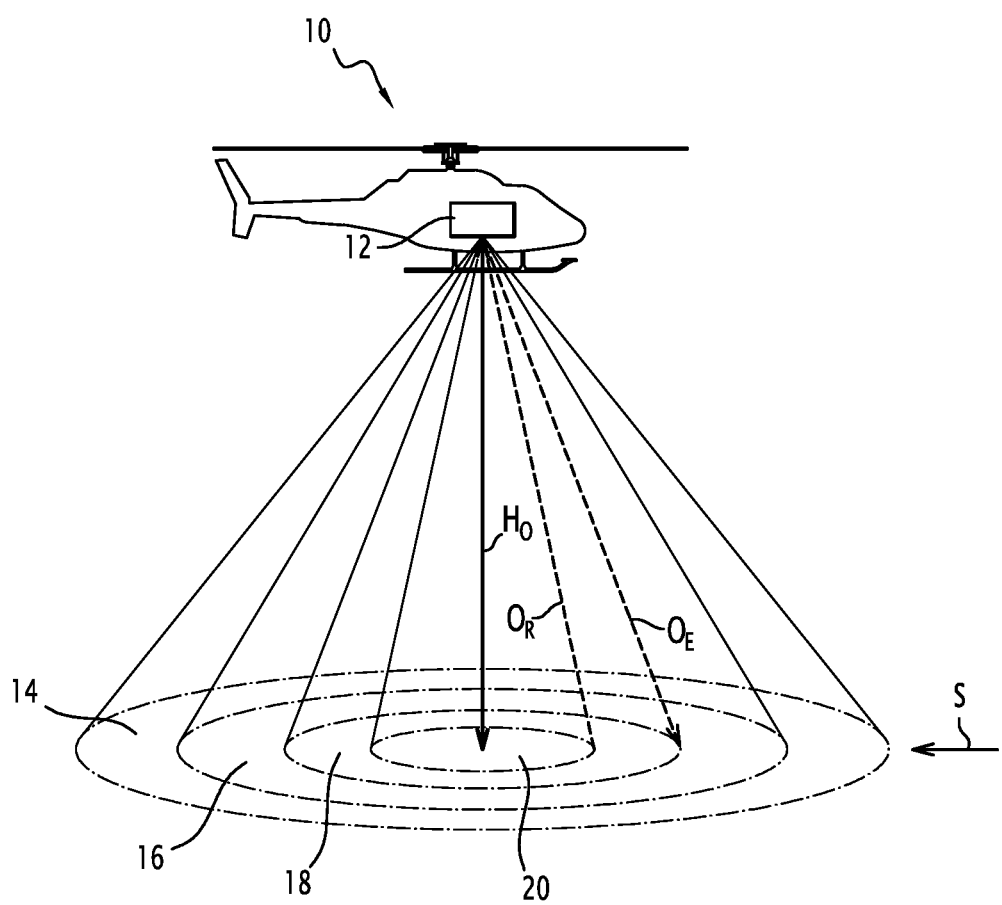

(51) Int. Cl.
*H01Q 21/30* (2006.01)
*H01Q 25/00* (2006.01)
*G01S 13/34* (2006.01)
*G01S 13/32* (2006.01)

(58) Field of Classification Search
USPC .......................................................... 342/122
See application file for complete search history.

(56) References Cited

U.S. PATENT DOCUMENTS

| | | | |
|---|---|---|---|
| 2009/0315761 A1* | 12/2009 | Walter | G01S 13/345 342/200 |
| 2012/0188117 A1 | 7/2012 | Jeong et al. | |
| 2013/0116011 A1 | 5/2013 | Lee et al. | |

OTHER PUBLICATIONS

Preliminary Search Report for FR1501559, completed Apr. 25, 2016.
Written Opinion for FR 15 01559, filed Jul. 22, 2015.

* cited by examiner

RADIOELECTRIC DEVICE FOR TRANSMITTING AND RECEIVING RADIOELECTRIC WAVES AND ASSOCIATED RADIO ALTIMETRY SYSTEM

The present invention relates to a radioelectric device for transmitting and receiving radio waves including a radio wave generator generating radio waves that are frequency-modulated by a predetermined modulation signal and a transceiver antenna system, having an associated antenna aperture angle.

It also relates to an associated radio altimetry system.

It is applicable in the radiocommunication field, and more particularly in the aeronautic field.

Radio altimetry systems, used in the civil or military aeronautics field, are generally referred to as radio altimeters.

A radio altimeter is an instrument installed on board an aircraft and able to provide the height of the aircraft relative to the ground or an overflown surface. A radio altimeter is in particular used during automatic flight phases or critical flight phases, such as the approach, landing and takeoff. The radio altimeter is an essential element in providing assistance to the pilot, in particular when there is no visibility, in a use coupled with other equipment of the TAWS (terrain awareness warning system) or AFCS (automatic flight control system) type, and mission computers for computing a minimum height.

The height measurement provided by the radio altimeter may also be used for various computational applications carried out by the onboard computer, for example recalibrating the position of the aircraft relative to a preestablished map of the overflown terrain.

In the state of the art, different types of radio altimeters are known, the general principle of such instruments being to measure the height by measuring the propagation time of radio signals transmitted and received after reflecting off the ground.

A radio altimeter includes a generator of radio waves that are frequency-modulated by a predetermined modulation signal and a transceiver antenna system, having an associated antenna aperture angle.

It is known to use the continuous transmission of a radio wave frequency-modulated by a modulation signal including ramps, with a substantially linear slope, according to a frequency or slope swing δF, referred to as frequency-modulated continuous wave (FMCW). In the civil field, the frequency band used is from 4.2 to 4.4 GHz. After being reflected on the ground, a reflected radio wave is received as an echo after a duration that depends on the height of the aircraft and therefore makes it possible to compute that height.

The precision of the computation in particular depends on the size of the transmitted wave reception zone on the targeted surface, which is generally the ground, which depends on the aperture of the antenna system and the flight altitude.

When the antenna system used has a fixed aperture, the size of the reception zone varies considerably with the altitude of the aircraft. Indeed, the higher the altitude is, the larger the reception zone is.

The enlargement of the reception zone has several drawbacks, in particular the possibility of catching on highly reflective elements, which may distort the computation of the overflown height.

Furthermore, uncertainty regarding the direction associated with the computed height information causes potential errors for the radio altimetric recalibration, without adding interferometry systems requiring additional antennas.

Thus, it is desirable to better target the transmission of radio waves in order to better control the analyzed zone and thus improve the precision of the height computation by the radio altimeter.

More generally, in radiocommunication systems in which the distance between the transmitter and receiver may change dynamically, it is useful to better control the size of the reception zone of the transmitted radio waves.

One aim of the invention is to resolve this problem, while retaining a system having a compactness comparable to the traditional antenna systems.

To that end, according to a first aspect, the present invention proposes a radioelectric device for transmitting and receiving radio waves including a radio wave generator generating radio waves that are frequency-modulated by a predetermined modulation signal and a transceiver antenna system, having a transmission-reception angle with an associated antenna aperture value, able to transmit said transmitted radio wave and receive a radio wave.

The antenna system comprises a first array of radiating elements able to radiate in a first frequency band and at least one second array of radiating elements able to radiate in a second frequency band, a plurality of activation elements able to activate and/or deactivate each of the first array and second array of radiating elements, and a control module able to control said activation elements based on a selected antenna aperture value.

Advantageously, the radioelectric device for transmitting-receiving radio waves according to the invention makes it possible to dynamically select the antenna aperture by activating or deactivating arrays of radiating elements. Furthermore, the addition of at least a second array of radiating elements able to radiate in a second frequency band in an antenna system including a first array of radiating elements has a low impact on its sizing.

The radioelectric device for transmitting-receiving radio waves according to the invention may have one or more of the features below, considered independently or in all technically acceptable combinations.

This device includes a module for obtaining a selected antenna aperture value.

The antenna system includes a plurality of second arrays of radiating elements, arranged in a matrix of second arrays of radiating elements, each second array of radiating elements having its own power supply point.

The activation [elements] are switches, and the device includes a plurality of switches arranged so as to produce a plurality of activation/deactivation configurations of said first and second arrays of radiating elements.

The antenna aperture value is selected from among a discrete set of antenna aperture values, each antenna aperture value of said discrete set corresponding to an activation/deactivation configuration of said first and second arrays of radiating elements.

This device includes a memory module, and the discrete set of antenna aperture values, as well as, for each antenna aperture value, the associated activation/deactivation configuration of said first and second arrays of radiating elements, are stored.

According to another aspect, the invention relates to a method for transmitting-receiving radio waves carried out by a radioelectric device for transmitting-receiving radio waves as briefly described above.

This method includes, in transmission or reception mode, the following steps:
- obtaining a selected antenna aperture value,
- controlling a plurality of activation/deactivation elements of the first and second arrays of radiating elements based on the selected antenna aperture value.

This method for transmitting-receiving radio waves according to the invention may have one or more of the features below, considered independently or in all technically acceptable combinations.

It further includes, in transmission mode, a step for generating at least one radio wave frequency-modulated by a predetermined modulation signal in a first frequency band.

In transmission mode, it includes the following steps:
- comparing the selected antenna aperture value to a maximum antenna aperture value,
- if the comparison is negative, transposing the generated radio waves in a second frequency band.

In reception mode, this method further includes the following steps:
- comparing the selected antenna aperture value to a maximum antenna aperture value,
- if the comparison is negative, transposing the received radio waves in the first frequency band.

According to another aspect, the invention relates to a radio altimeter system suitable for being fastened to an airborne system and providing a distance of said airborne system relative to a surface, including a radioelectric device for transmitting-receiving radio waves as briefly described above, able to transmit a radio wave and to receive a radio wave reflected by said surface, the radio altimeter system further including a processing module able to compute said distance as a function of the transmitted and reflected radio waves.

Advantageously, the computation precision of the distance between the airborne system and said surface is improved owing to the possibility of varying the antenna aperture of the antenna system.

Figure 2:
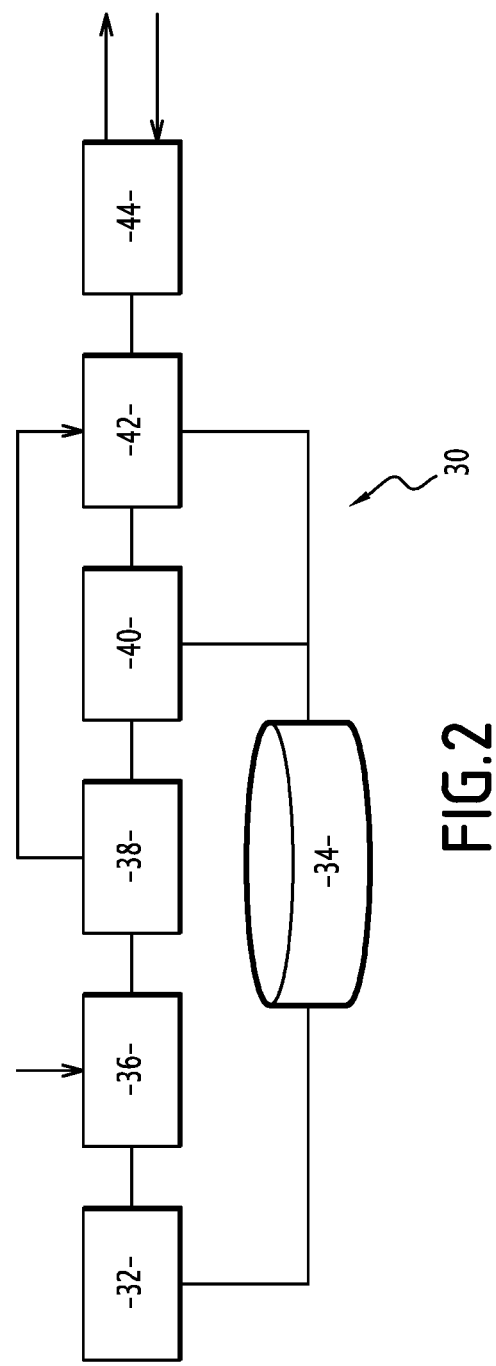
Figure 3:
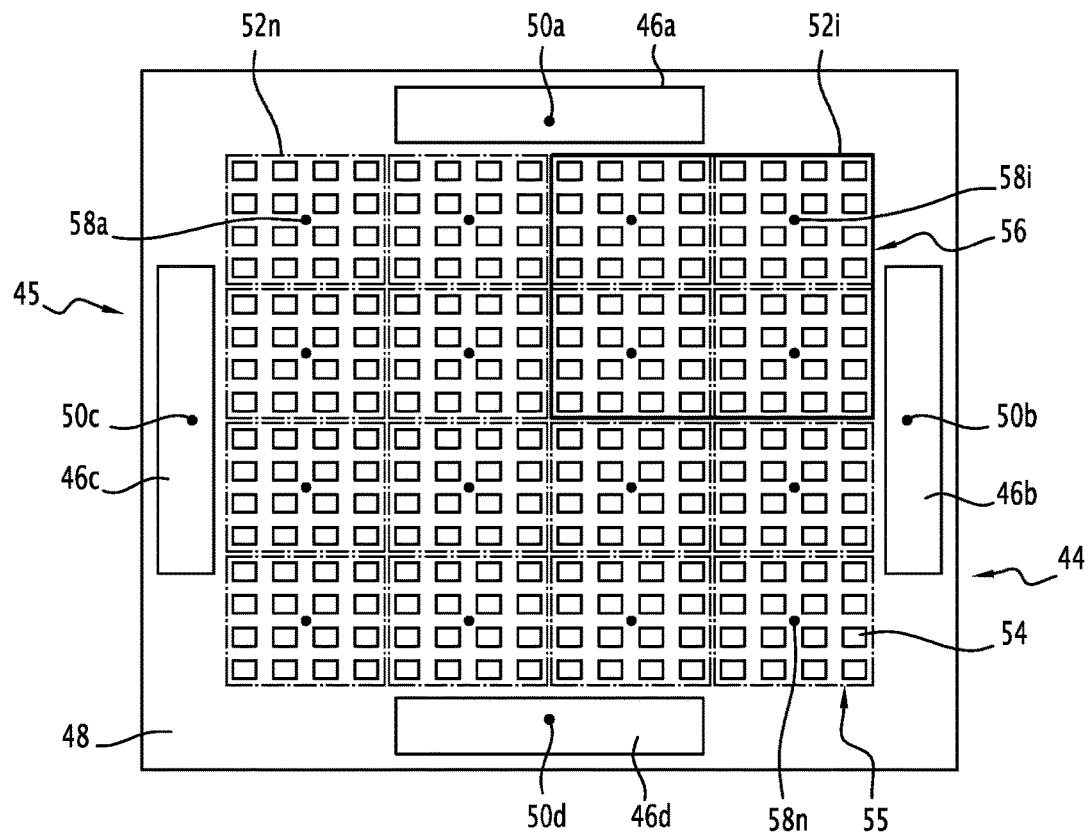
Figure 4:
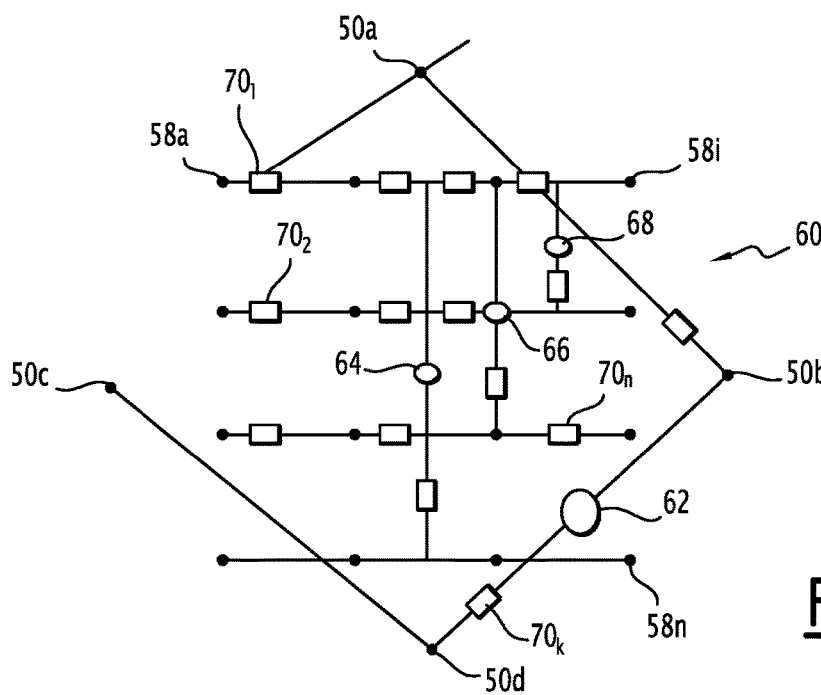
Figure 5:
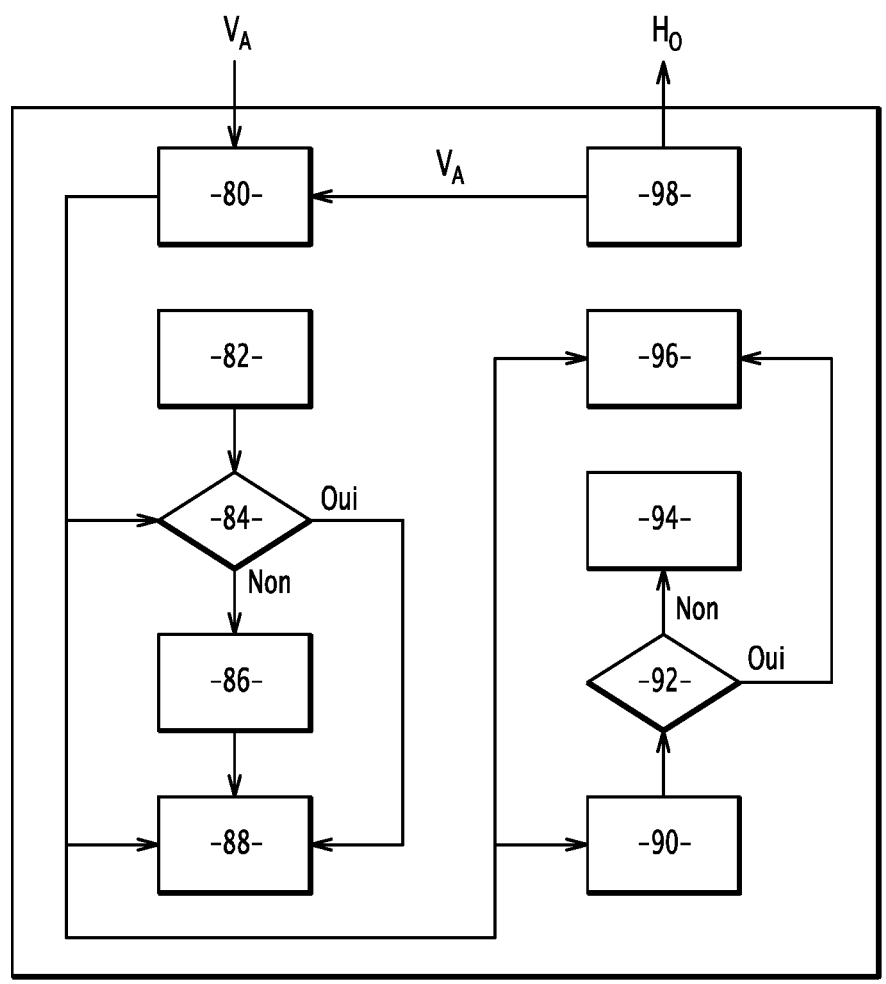

Other features and advantages of the invention will emerge from the description thereof provided below, solely for information and non-limitingly, in reference to the appended figures, in which:

FIG. 1 diagrammatically illustrates an aircraft equipped with a radio altimeter and an associated reception zone on the ground;

FIG. 2 shows the main functional modules of a radioelectric device for transmitting-receiving radio waves according to one embodiment of the invention;

FIG. 3 diagrammatically shows arrays of radiating elements of an antenna system;

FIG. 4 diagrammatically shows a control circuit for activating/deactivating the arrays of radiating elements of FIG. 3;

FIG. 5 is a flowchart of the main steps of a method implemented by a radio altimeter system according to one embodiment of the invention.

The radioelectric device according to the invention is described as it applies in a radio altimetry system (or radio altimeter), fastened to an airborne system.

In the example diagrammed in FIG. 1, an aircraft 10 is equipped with a radio altimeter 12, fastened to the aircraft 10, which is a helicopter in this example.

The radio altimeter 12 is equipped with a radioelectric device 30 (FIG. 2) for transmitting-receiving radio waves according to the invention, including an antenna system and able to transmit a radio wave or a beam of radio waves toward a targeted surface S, for example the ground.

Advantageously, the radioelectric device for transmitting-receiving radio waves makes it possible to select an antenna aperture value and to obtain reception zones 14, 16, 18 and 20 with different sizes depending on the selected antenna aperture value.

The purpose of the radio altimeter 12 is to estimate the minimum overflown distance $H_0$, based on one or more transmitted radio waves $O_E$ and reflected radio waves $O_R$.

In one embodiment, each transmitted radio wave is frequency-modulated, for example according to a signal including frequency variation ramps ranging between a value $F_{min}$ and a value $F_{max}$, according to a frequency swing $\Delta F = abs(F_{max} - F_{min})$, where abs represents the absolute value. The radio waves $O_E$ reflect on the ground S, and produce reflected waves $O_R$. This operating mode is called "frequency-modulated continuous wave" (FMCW).

It should be noted that the application of the invention is not limited to this operating mode of a radio altimeter.

The reception zones 14, 16, 18 and 20 have variable sizes depending on the selected antenna aperture value.

Each reception zone, or spot on the ground, is the radiation zone of the radio waves transmitted with a given antenna aperture value. Each reception zone is substantially circular, its radius depending on the antenna aperture value.

It should be noted that the reception zones 14 to 20 are all shown in FIG. 1 for explanatory purposes. In practice, and as explained in detail below, following a selection of antenna aperture value, a single reception zone from among the reception zones 14 to 20 is effective.

In the example of FIG. 1, a reception zone 14 is diagrammatically shown corresponding to a first frequency band of the electromagnetic spectrum, for example the C band, defined by frequencies from 4 to 8 GHz.

The reception zone 20 corresponds to a second frequency band of the electromagnetic spectrum, for example the Ka band, defined by frequencies from 27 to 40 GHz.

Furthermore, two additional reception zones of 16 and 18, corresponding to a selection of different arrays of radiating elements in the second frequency band.

Thus, the antenna system of the radioelectric device for transmitting-receiving radio waves is able to operate, in the described embodiment, in two frequency bands, a first frequency band, or low band, and a second frequency band, or high band, and several antenna aperture values, corresponding to reception zones with different sizes, can be selected in the second frequency band.

As explained in more detail below, these different antenna aperture values can be achieved via an activation or deactivation control, by power supply, of radiating antenna elements.

FIG. 2 diagrammatically illustrates the main functional units of a radioelectric device for transmitting-receiving radio waves according to one embodiment of the invention, able to be integrated into a radio altimeter and allowing a selection of one antenna aperture value from among a plurality of antenna aperture values.

The radioelectric device 30 comprises an input interface module 32 for acquiring various operating parameters, to be stored in a memory 34, and a module 36 for obtaining an antenna aperture value.

In one embodiment, the module 36 receives an antenna aperture value from an operator.

Alternatively, the module 36 receives an antenna aperture value from another computation module, for operation in a loop to select an optimized antenna aperture value for a given application, for example a height computation $H_0$ when the radioelectric device 30 is integrated into a radio altimeter.

The radioelectric device 30 includes a module 38 for generating a radio wave in a first frequency band, for example the C band.

A module 40 for transposing the radio waves into a second frequency band is optionally implemented, based on the selected aperture value obtained by the module 36 for obtaining an antenna aperture value. For example, the second frequency band is the Ka band.

Indeed, if the antenna aperture value corresponds to the maximum antenna aperture, the transmission of the radio wave is done in the first frequency band, which is lower than the second frequency band.

Alternatively, the modules 38 and 40 are replaced by a single module for generating and shaping a radio wave in a frequency band selected by a parameter.

A control module 42 makes it possible to select the radiating elements of the antenna system 44 to be used for transmission and reception.

Indeed, the antenna system 44 comprises a first array of radiating elements able to transmit in the first frequency band.

It also comprises a set of second arrays of radiating elements able to transmit in the second frequency band.

FIG. 3 diagrammatically illustrates an antenna system 44 according to one embodiment.

The system includes a first array 45 of first radiating elements operating in the low band 46a, 46b, 46c and 46d, positioned on a reflective support plane 48 and each including a power supply point 50a, 50b, 50c and 50d. Each of the first radiating elements is activated when it is supplied with electricity.

In this embodiment, second arrays of radiating elements $52_1, \ldots, 52_i, \ldots 52_n$, operating in the high band, are positioned on the same support plane 48.

Each of these second arrays of radiating elements is made up of a regular pad of radiating elements or elementary patches 54, arranged in a regular mesh.

In the illustrated example, the regular mash is square, but any other regular mesh can be considered.

For example, according to one alternative, the second radiating elements are arranged in concentric rings.

The second arrays $52_1$ to $52_n$ are arranged in a matrix 55 of second arrays of radiating elements.

Each of the second arrays of radiating elements $52_i$ includes a power supply point $58_i$, making it possible to activate, or not activate, that array for transmission and reception.

Advantageously, each of these second arrays of radiating elements $52_i$ can be activated individually, which makes it possible to make various selections of sets of second arrays activated by the control module 42, forming a transmission-reception configuration of second arrays of radiating elements able to transmit and receive a beam of radio waves corresponding to a different antenna aperture value. An antenna system is obtained with multiple selectable antenna aperture values.

For example, activating the first array 45 of radiating elements makes it possible to obtain the reception zone 14 of FIG. 1, and activating the entire matrix 55 of second arrays makes it possible to obtain the reception zone 20 of FIG. 1.

The activation of the set of second radiating arrays forming the sub-matrix 56 makes it possible to obtain the reception zone 18, and activating a single square 52, makes it possible to obtain the zone 16.

Here, we have illustrated a selection of 4 configurations of second arrays of activated radiating elements, but it is understood that a number N of configurations greater than 4 can be achieved, depending on the number and arrangement of the considered arrays of radiating elements.

FIG. 4 diagrammatically illustrates a circuit 60 for activating/deactivating the arrays of radiating elements of FIG. 3. The various power supply points of the corresponding first and second arrays of radiating elements of FIG. 3, as well as activation elements, for example switches, make it possible to control the activation and deactivation of the various arrays of radiating elements.

The electric circuit 60 includes a power supply point 62 of the first array of radiating elements, and power supply points 64, 66, 68 for powering the considered sets of second arrays.

More generally, each of the sets of first and second arrays of radiating elements associated with an antenna aperture value has an associated power supply point.

The circuit of FIG. 4 includes switches $70_1, \ldots, 70_k, \ldots, 70_n$ making it possible to supply power, or not supply power, to the first and second arrays of radiating elements.

Alternatively, the activation/deactivation elements $70_1, \ldots, 70_k, \ldots, 70_n$ are switches.

Various opening/closing configurations of the activation elements $70_1$ to $70_n$ are provided, each configuration corresponding to a set of activated radiating element arrays and a given antenna aperture value.

The various configurations, indicating the correspondence between positions of the various switches and associated antenna aperture value, are stored in a memory module 34, for example in registers or file.

Thus, the choice of the antenna aperture associated with the antenna system 44 is made owing to the selection of the position of the various activation elements of the circuit 60.

A discrete set of different antenna aperture values may be obtained.

According to one embodiment of the invention, a radio altimeter suitable for being fastened to an airborne system and providing a distance of said airborne system relative to a surface, includes a radioelectric device as described above and a processing module able to compute said distance as a function of the transmitted and reflected radio waves.

FIG. 5 is a flowchart of the main steps carried out by a radio altimeter comprising a radiofrequency device as described above, for computing a distance relative to an overflown surface.

During a step 80, an antenna aperture value $V_A$ to be applied is obtained, either via a man-machine interface under an operators control, or by computation as explained below.

A beam of radio waves to be transmitted is generated during a step 82, in a first frequency band, for example the C band.

During a verification step 84, it is verified whether the antenna aperture value is equal to a maximum aperture value previously stored.

In case of negative response, step 84 is followed by a transposition step 86 in order to transpose the radio waves to be transmitted to the second frequency band, for example the Ka band.

In case of positive response to the verification step 84, or after step 86, the step 88 for choosing arrays of transmitting radiating elements consists of determining, based on the antenna aperture value $V_A$, from configurations previously stored matching the various possible antenna aperture values with an opening/closing configuration of the switches of the control circuit.

For example, when the antenna aperture value $V_A$ is the maximum aperture value, only the first array of radiating elements is activated.

Step 88 for choosing arrays of transmitting radiating elements applies an activation/deactivation control of the switches allowing the supply of electricity of the various selected arrays of radiating elements and the transmission of radio waves.

In reception mode, an activation/deactivation of the arrays of radiating elements is also carried out during a step 90, based on the antenna aperture value $V_A$.

Step 90 is followed by a verification step 92, similar to step 84, in order to verify whether the antenna aperture value $V_A$ is equal to a maximum aperture value previously stored.

In case of negative response, step 92 is followed by a transposition step 94 in order to transpose the received radio waves in the first frequency band.

In case of positive response to the verification step 92, or after step 94, step 96 carries out the various reception and demodulation operations of the received radio waves, transposed, if applicable, in the first frequency band.

Next, a step 98 for extraction and computation of the distance between the radio altimeter and the surface having reflected the received radio waves is applied.

If the radio altimeter determines, according to methods specific to it and based on its mission, that the analyzed reception zone is not satisfactory, it may command a new antenna aperture value. A new antenna aperture value, smaller than the antenna aperture value $V_A$ used, is obtained and steps 80 to 98 are iterated.

Advantageously, this embodiment carries out traditional radio wave processing operations in the first frequency band.

Advantageously, a known radio altimeter, in the C band, modified by adding modules for obtaining antenna aperture values, performing transpositions between said first and second frequency bands and controlling the activation/deactivation of the arrays of radiating elements to be used in transmission and reception, is usable.

Thus, the proposed solution has low manufacturing costs, while maintaining the compactness of the device.

The invention has been described as it applies to a radiofrequency device able to transmit and receive in two different frequency bands. However, the invention is not limited to this application scenario, and is applicable for operation with more than two frequency bands, arrays of radiating elements being able to be selected in each frequency band to achieve various antenna aperture values.

The invention claimed is:

1. A radioelectric device for transmitting and receiving radio waves including a radio wave generator generating radio waves that are frequency-modulated by a predetermined modulation signal and a transceiver antenna system, having a transmission-reception angle with an associated antenna aperture value, able to transmit said transmitted radio wave and receive a radio wave,
   the antenna system comprising a first array of radiating elements able to radiate in a first frequency band and at least one second array of radiating elements able to radiate in a second frequency band, each second array of radiating elements being made up of a regular pad of radiating elements or elementary patches,
   a plurality of activation elements able to activate and/or deactivate each of the first array and second array of radiating elements, each second array of radiating elements being able to be activated or deactivated individually via a said activation element,
   and a control module able to control the activation elements based on a selected antenna aperture value selected from among a discrete set of antenna aperture values, each antenna aperture value of said discrete set corresponding to an activation/deactivation configuration of said first and second arrays of radiating elements.

2. The radioelectric device according to claim 1, further comprising a module for obtaining a selected antenna aperture value.

3. The radioelectric device according to claim 1, wherein the antenna system comprises a plurality of second arrays of radiating elements, arranged in a matrix of second arrays of radiating elements, each second array of radiating elements having its own power supply point.

4. The radioelectric device according to claim 1, wherein the activation elements are switches, and wherein the device comprises a plurality of switches arranged so as to produce a plurality of activation/deactivation configurations of said first and second arrays of radiating elements.

5. The radioelectric device according to claim 1, further comprising a memory module, and wherein the discrete set of antenna aperture values, as well as, for each antenna aperture value, the associated activation/deactivation configuration of said first and second arrays of radiating elements, are stored.

6. A method for transmitting-receiving radio waves carried out by a radioelectric device for transmitting-receiving radio waves according to claim 1,
   comprising, in transmission or reception mode:
      obtaining a selected antenna aperture value,
      controlling a plurality of activation/deactivation elements of the first and second arrays of radiating elements based on the selected antenna aperture value.

7. The method according to claim 6, further comprising, in transmission mode, generating at least one radio wave frequency-modulated by a predetermined modulation signal in a first frequency band.

8. The method according to claim 7, further comprising, in transmission mode:
   comparing the selected antenna aperture value to a maximum antenna aperture value, and
   if the comparison is negative, transposing the generated radio waves in a second frequency band.

9. The method according to claim 6, wherein in reception mode, the method further comprises:
   comparing the selected antenna aperture value to a maximum antenna aperture value, and
   if the comparison is negative, transposing the received radio waves in the first frequency band.

10. A radio altimeter system suitable for being fastened to an airborne system and providing a distance of said airborne system relative to a surface, comprising a radioelectric device for transmitting-receiving radio waves according to claim 1, able to transmit said radio wave and to receive a radio wave reflected by said surface, the radio altimeter system further including a processing module able to compute said distance as a function of the transmitted and reflected radio waves.

* * * * *